United States Patent [19]

Tateishi

[11] Patent Number: 5,446,713
[45] Date of Patent: Aug. 29, 1995

[54] OPTICAL PICKUP DRIVE CONTROL APPARATUS WITH VIBRATION RESTRAINT

[75] Inventor: Kiyoshi Tateishi, Tokorozawa, Japan

[73] Assignee: Pioneer Electronic Corporation, Tokyo, Japan

[21] Appl. No.: 143,474

[22] Filed: Oct. 26, 1993

[30] Foreign Application Priority Data

Oct. 27, 1992 [JP] Japan .................................. 4-288598

[51] Int. Cl.6 ............................................. G11B 7/085
[52] U.S. Cl. ..................... 369/44.28; 369/32; 369/44.29; 369/44.32
[58] Field of Search ................... 369/44.28, 44.29, 124, 369/44.35, 44.36, 44.32, 32; 360/78.05, 77.03, 215, 244

[56] References Cited

U.S. PATENT DOCUMENTS

| | | | |
|---|---|---|---|
| 4,562,562 | 12/1985 | Moriya et al. | 369/44.28 |
| 4,866,687 | 9/1989 | Kasai et al. | 369/32 |
| 4,930,114 | 5/1990 | Tateishi | 360/78.05 |
| 5,054,013 | 10/1991 | Kawamura | 369/44.28 |
| 5,063,549 | 11/1991 | Yamamuro | 369/44.29 |
| 5,182,736 | 1/1993 | Yanagi | 369/44.28 |

Primary Examiner—W. R. Young
Assistant Examiner—Thang V. Tran
Attorney, Agent, or Firm—Kane, Dalsimer, Sullivan, Kurucz, Levy, Eisele and Richard

[57] ABSTRACT

An optical pickup is provided with a slider for transporting the optical pickup in a direction of crossing a track on an optical disk, and a tracking unit mounted on the slider movably in the direction of crossing the track. A rough seeking mode to access a desired track on the optical disk at a high speed is set as one operation mode of the optical pickup. The drive control apparatus for the optical pickup includes: a slider transferring speed detecting device for detecting a transferring speed of the slider; a track crossing speed detecting device for detecting a track crossing speed when the slider crosses the track, the track crossing speed being prescribed by a sum of the transferring speed of the slider and a relative speed of the tracking unit with respect to the slider including a vibrating component of the tracking unit; a vibrating component extracting device for extracting the vibrating component of the tracking unit by subtracting the detected transferring speed of the slider from the detected track crossing speed in the rough seeking mode, and for outputting a vibrating component signal indicating the extracted vibrating component; and a loop for feeding back the vibrating component signal to the tracking unit in the rough seeking mode.

8 Claims, 5 Drawing Sheets

OPTICAL PICKUP DRIVE CONTROL APPARATUS WITH VIBRATION RESTRAINT

BACKGROUND OF THE INVENTION

1. Field of the Invention

The present invention relates to an optical information recording and reproducing apparatus, such as a CD (Compact Disk) player and a VD (Video Disk) player. More particularly, it relates to an improvement of a vibration restraining technique in a tracking unit by a drive control apparatus for an optical pickup.

2. Description of the Related Arts

In a drive control apparatus for an optical pickup, a rough seeking mode is set as an operation mode to access a desired information track on a CD, at a high speed in a CD player. In this rough seeking mode, an operation to control an acceleration and a deceleration of the slider is performed according to a distance from the present position of the optical pickup to the target track.

In the rough seeking mode, at the time of drive-controlling the optical pickup, the control is performed in such a state that only a slider servo-loop is closed while a tracking servo-loop is opened. The purpose of opening the tracking servo-loop, is to prevent the servo-control from being applied with respect to the track other than the target track when the optical pickup crosses through the tracks.

In the slider servo-loop, for example, a track number is counted on the basis of a tracking position error, which is detected and supplied thereto. On the other hand, a desired track number is set by a keyboard. When the counted track number reaches the set value of the track number, the target speed data of the tracking unit is computed on the basis of a speed value (or an access target) inputted by the key board. The target speed data is converted into a reference value of the tracking unit speed. On the other hand, the track crossing speed (which is equal to the sum of the slider speed and the relative speed of the tracking unit with respect to the slider including the vibrating component of the tracking unit), is calculated on the basis of the tracking position error, so that an output value is obtained by subtracting the track crossing speed from the reference value of the tracking unit speed.

This output value is selectively inverted depending whether the slider moves forward or backward, is added to the output from an accelerating pulse generator to accelerate the slider, and is supplied to the slider driving coil to perform the speed control of the slider.

In a normal operation mode, the tracking loop is closed. The tracking position error is detected, and is supplied to the tracking unit, and is further supplied to the slider driving coil.

As mentioned above, since only the slider control is performed in the rough seeking mode, the force is applied to the tracking unit at the time of acceleration or deceleration, so that the tracking unit vibrates with a self-resonance frequency. Accordingly, if it is tried to strengthen the acceleration force and the deceleration force so as to move the slider at a high speed, the vibration becomes intense, so that the focus servo-control of a two axes unit becomes out of order. For this reason, the level of the tracking signal decreases, and thus the error in the track count becomes large. If the acceleration force or the deceleration force applied to the slider is further increased, the focus servo-control may become disabled. On the other hand, in case that the rough seeking is ended, when the tracking loop is being closed, there arises a problem that the drawing-in ability degrades due to the aforementioned vibration. In this manner, the unnecessary vibration of the tracking unit generated at the time of rough-seeking becomes an obstacle to accelerate the access by increasing the speed of the slider.

As a countermeasure to prevent such a vibration of the tracking unit, the tracking unit may be driven such that, for example, the force to be applied to the tracking unit is estimated from the electric current value flowing to the slider, and the force to be applied is subtracted in advance by applying the estimated value to the tracking unit (Japanese Patent Publication No. 4-35830). However, since this type of drive control apparatus for the optical pickup, indiscriminately performs the control by use of the estimated value to be applied to the tracking unit, it cannot suitably cope with the variation in the characteristics of the slider or the tracking unit.

SUMMARY OF THE INVENTION

It is therefore an object of the present invention, to provided a drive control apparatus for an optical pickup, which can restrain the generation of the vibration in correspondence with the variations in the slider or the tracking coil.

According to the present invention, the above object can be achieved by a drive control apparatus for an optical pickup, which is provided with a slider for transporting the optical pickup in a direction of crossing a track on an optical disk, and a tracking unit mounted on the slider movably in the direction of crossing the track, and to which a rough seeking mode to access a desired track on the optical disk at a high speed is set as one operation mode of the optical pickup. The drive control apparatus includes: a slider transferring speed detecting device for detecting a transferring speed of the slider; a track crossing speed detecting device for detecting a track crossing speed when the slider crosses the track, the track crossing speed being prescribed by a sum of the transferring speed of the slider and a relative speed of the tracking unit with respect to the slider including a vibrating component of the tracking unit; a vibrating component extracting device for extracting the vibrating component of the tracking unit by subtracting the detected transferring speed of the slider from the detected track crossing speed in the rough seeking mode, and for outputting a vibrating component signal indicating the extracted vibrating component; and a loop for feeding back the vibrating component signal to the tracking unit in the rough seeking mode.

In the above mentioned construction of the present invention, the detection signal of the transferring speed of the slider, which is obtained by the slider transferring speed detecting device, is supplied to the vibrating component extracting device. The detection signal of the track crossing speed, which is obtained by the track crossing speed detecting device, is also supplied to the vibrating component extracting device. The vibrating component extracting device performs a subtraction with respect to the inputted detection signal of the track crossing speed and the inputted detection signal of the slider transferring speed. Namely, since the detection signal of the track crossing speed includes the vibrating component of the tracking unit, and therefore, the vibrating component signal is extracted by subtracting the detection signal of the slider transferring speed from the detection signal of the track crossing speed. This extracted vibrating component signal is supplied to the tracking unit via the feedback loop, and acts as a signal to restrain the vibration of the tracking unit.

In this manner, since the negative feedback control of the tracking unit is carried out by use of the actually measured value of the vibrating component, which is generated at the tracking unit, it becomes possible to control the vibration in correspondence with each peculiar characteristic of the slider and the tracking unit.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, an embodiment of the present invention will be now explained.

Figure 1:
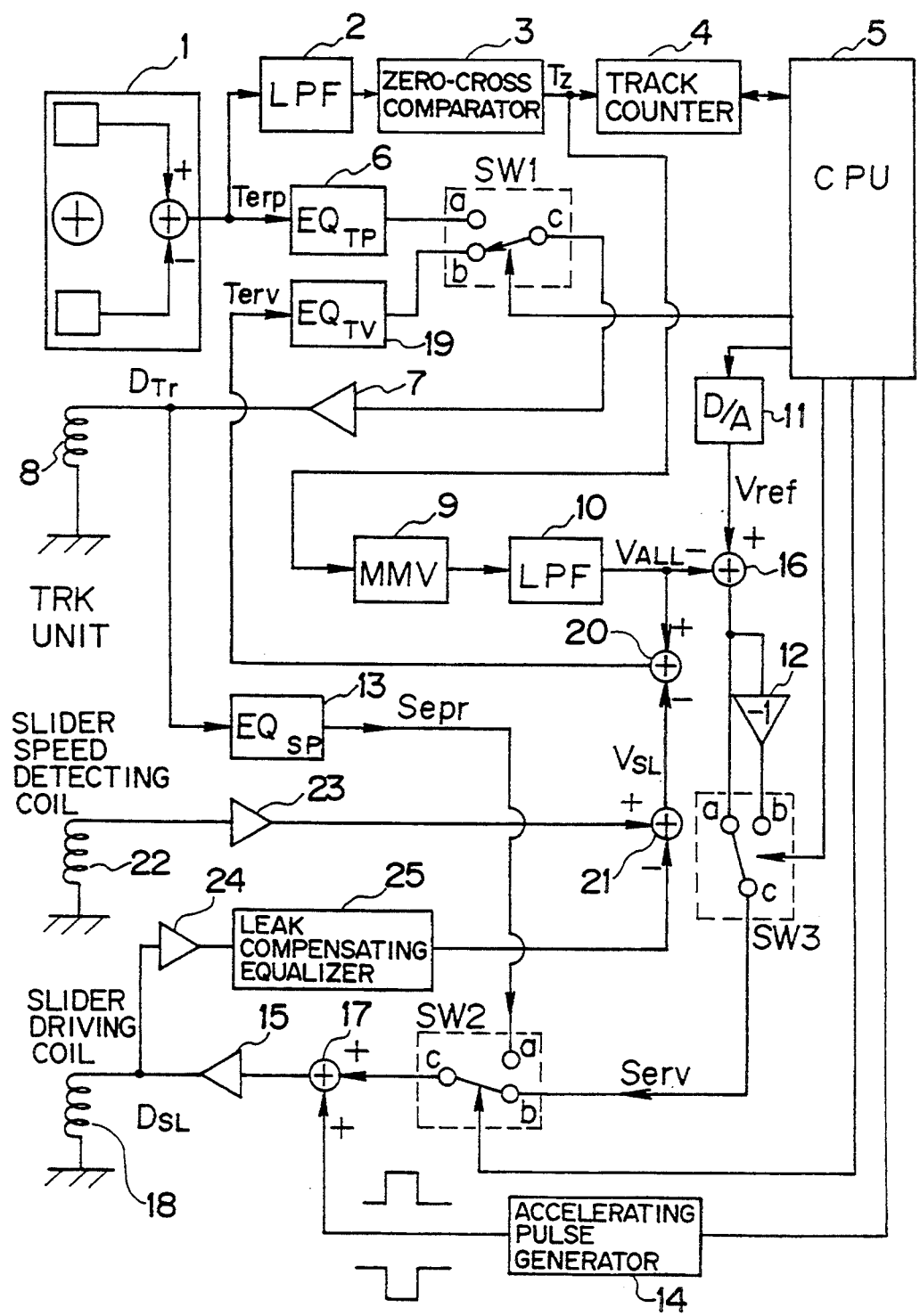
FIG. 1 is a block diagram showing an embodiment of a drive control apparatus for an optical pickup according to the present invention.

In FIG. 1, a drive control apparatus for an optical pickup is provided with a tracking detector 1, a low pass filter (LPF) 2, a zero-cross comparator 3, a track counter 4, a CPU (Central Processor Unit) 5, an equalizer 6, an amplifier 7, a tracking unit driving coil 8, a mono-multivibrator 9, a low pass filter 10, a D/A converter 11, an invertor 12, an equalizer 13, an accelerating pulse generator 14, an amplifier 15, adders 16 and 17, a slider driving coil 18, an equalizer 19, adders 20 and 21, a slider speed detecting coil 22, amplifiers 23 and 24, a leak compensating equalizer 25, and switches SW1, SW2 and SW3.

In this drive control apparatus, a rough seeking mode is set as an operation mode to access a desired information track on a CD, at a high speed in a CD player. In this rough seeking mode, an operation to control an acceleration and a deceleration of the slider is performed according to a distance from the present position of the optical pickup to the target track.

In the slider servo-loop, a tracking position error Terp detected by the tracking detector 1, is supplied to the zero-cross comparator 3 through the low pass filter 2 to remove the noise. The output signal from the zero-cross comparator 3 is supplied to the track counter 4 and the mono-multivibrator 9 for every detected track. On the other hand, by an input device such as a keyboard, a desired track number is set i.e. preset or reset to the track counter 4 via the CPU 5. When the track number, which has been counted by the track counter 4 on the basis of the output from the zero-cross comparator 3, reaches the set value inputted by the keyboard, the count up signal, which indicates the fact of reaching to the set value, is supplied to the CPU 5. In the CPU 5, the target speed data of the tracking unit is computed on the basis of the speed value (or the access target etc.) inputted by the input device, such as a key board, while maintaining the synchronization by the count up signal. The target speed data is converted into a reference value Vref of the tracking unit speed through the D/A converter 11, and is supplied to the positive input terminal of the adder 16. On the other hand, the output of the zero crossing counter 3 is supplied to the mono-multivibrator 9 and the low pass filter 10.

The track crossing speed $V_{ALL}$ (which is equal to the sum of the slider speed and the relative speed of the tracking unit with respect to the slider including the vibrating component of the tracking unit), is calculated, and is supplied to the negative input terminal of the adder 16. The output of the adder 16 is a value obtained by subtracting the track crossing speed $V_{ALL}$ from the reference value Vref of the tracking unit speed, and is supplied to the terminal a of the switch SW3, or to the terminal b of the switch SW3 via the invertor 12. Here, the switch SW3 is controlled by the CPU 5 in the same manner as the switch SW1 and the switch SW2. When the slider moves forward, the switch SW3 is made in the state where the terminal a and the terminal c are connected. When the slider moves backward, the switch SW3 is made in the state where the terminal b and the terminal c are connected. The output $S_{erv}$ of the switch SW3 is supplied to the adder 17 through the switch SW2. On the other hand, the output from the accelerating pulse generator 14 to accelerate the slider, is also supplied to the adder 17. This accelerating pulse generator 14 is also controlled by the CPU 5. The output from the adder 17 is supplied to the slider driving coil 18 through the amplifier 15, to perform the speed control of the slider.

In a normal operation mode, the tracking loop is closed under the control of the CPU 5 (by closing the a side of the switch SW1), while setting the switch SW2 in the state where the terminal a and the terminal c are connected. The tracking position error Terp detected by the tracking detector 1, is supplied to the tracking unit 8 as a tracking driving signal Dtr through the equalizer 6, the switch SW1 and the amplifier 7, and is further supplied to the slider driving coil 18 as a slider driving signal $D_{SL}$ through the equalizer 13, the switch SW2, the adder 17 and the amplifier 15.

In FIG. 1, in case of the rough seeking mode, a tracking loop is closed (i.e. the terminal b and the terminal c are connected in the switch SW1) under the control of the CPU 5, and the switch SW2 is made in a condition where the terminal b and the terminal c are connected. In this condition, the tracking servo-control is performed as follows.

Namely, the slider driving current $D_{SL}$ from the amplifier 15 is supplied to the slider driving coil 18, and is also supplied to the leak compensating equalizer 25 through the amplifier 24. The leak compensating equalizer 25 has a frequency characteristic, which resembles the characteristic of the leak-magnetic field from the driving coil 18 to the speed detecting coil 22. When the slider driving current $D_{SL}$ is supplied, the leak compensating equalizer 25 outputs the presumed leak output corresponding to this supplied current. This presumed leak output is supplied to the negative input terminal of the adder 21. The speed output, including the noise due to the leak-magnetic field, of the amplifier 23, which is obtained by amplifying the output of the slider speed detecting coil 22, is supplied to the positive input terminal of the adder 21. The corrected speed output of the slider speed, in which the component due to the leak-magnetic field is cancelled, is obtained as the output of the adder 21, and is supplied to the negative input terminal of the adder 20. The track crossing speed $V_{ALL}$ (the sum of the slider speed and the relative speed with respect to the slider of the tracking unit, which includes the vibrating component of the tracking unit), is supplied to the positive input terminal of the adder 20. The slider speed component is cancelled at the output of the adder 20, and thus the output becomes the vibrating component of the tracking unit. This vibrating component of the tracking unit is fed back to the tracking unit 8 through the equalizer 19, the switch SW1 and the amplifier 7. Here, the equalizer 19 adjusts the signal frequency characteristic change and the phase change due to the existence of the magnetic circuit in the feedback loop.

Figure 2:
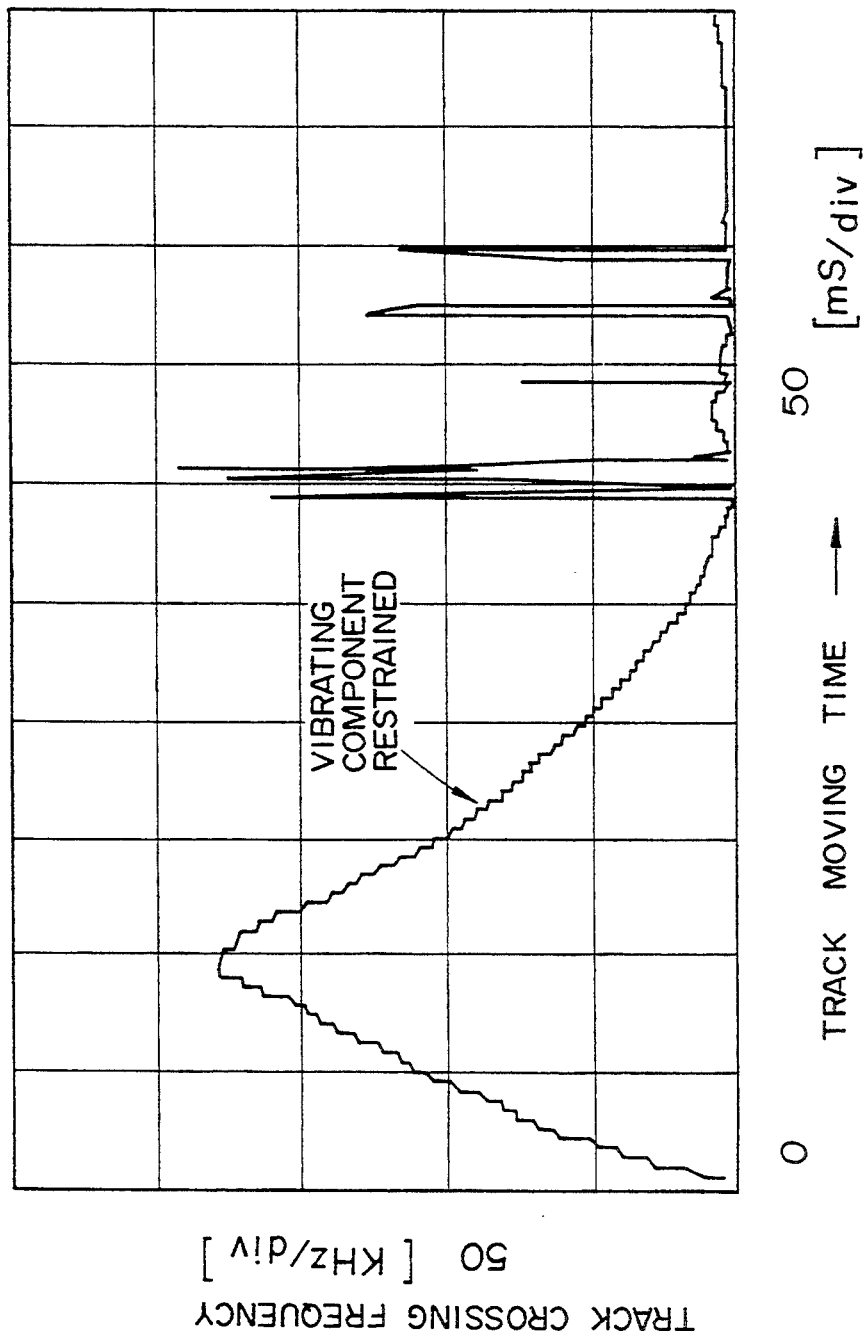
FIG. 2 is a figure which indicates a track crossing frequency characteristic of the tracking unit with respect to a track moving time in a rough seeking mode of the drive control apparatus for the optical pickup of FIG. 1.

FIG. 2 indicates the track crossing frequency characteristic with respect to the track moving time of the tracking unit in the rough seeking mode of the drive control apparatus for the optical pickup in the present embodiment. From FIG. 2, it is understood that the vibrating component at the time of acceleration and deceleration of the slider, is restrained by virtue of the tracking loop according to the present embodiment.

In order to verify the advantageous effect of the present embodiment, a track crossing frequency characteristic of a comparison example of a drive control apparatus for an optical pickup, in which the tracking loop in the rough seeking mode is removed from the construction of the present embodiment, is examined.

Figure 3:
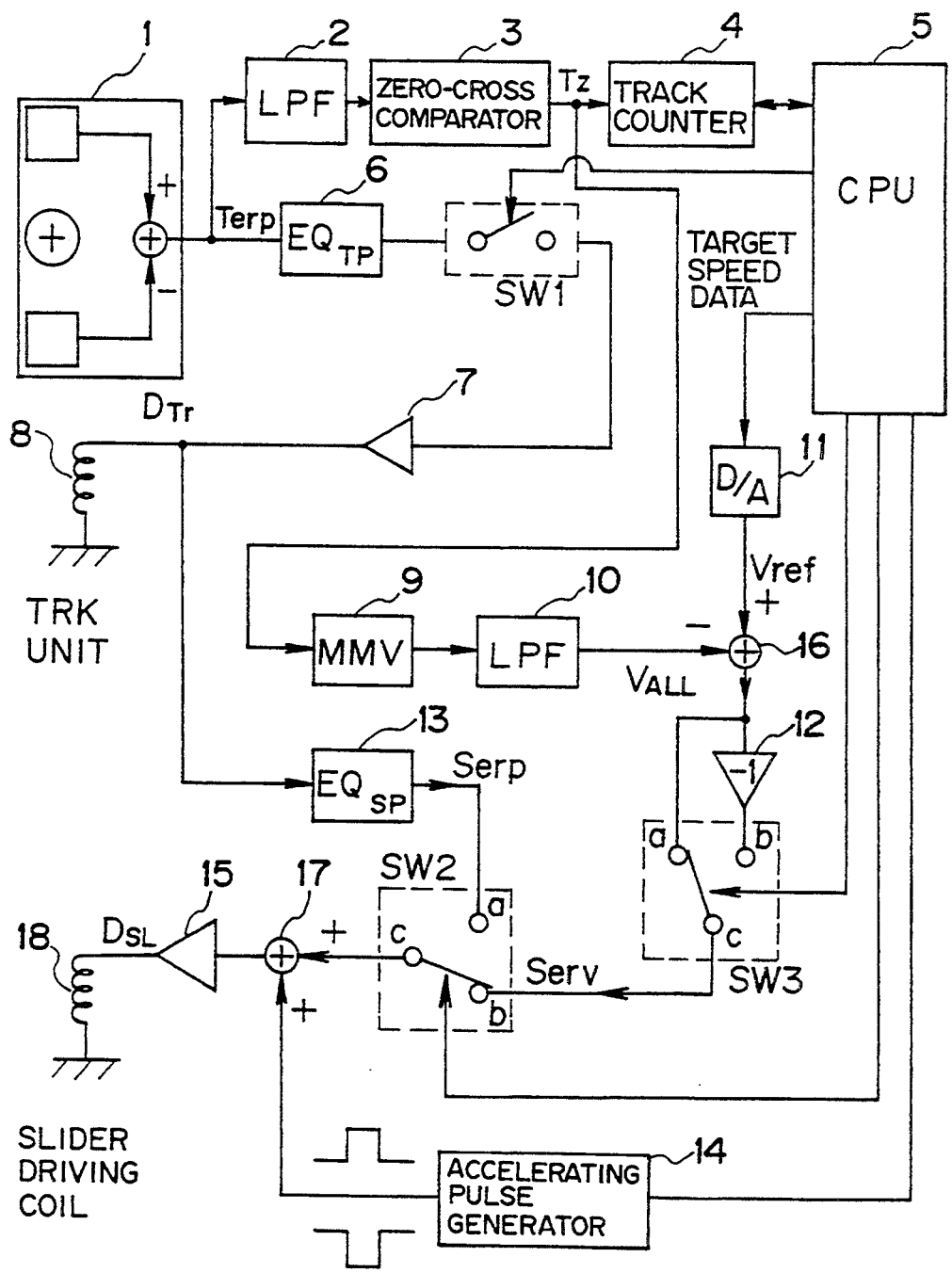
FIG. 3 is a block diagram showing a comparison example of a drive control apparatus for an optical pickup.

FIG. 3 shows the construction of the comparison example. In FIG. 3, the same constitutional elements as those in FIG. 1, carry the same reference numerals, and the explanations thereof are omitted. The different feature of the comparison example is that the slider speed detecting coil 22, the amplifiers 23 and 24, the leak compensating equalizer 25, the adders 20 and 21, the equalizer 19 and the terminal b of the switch SW1, which establish the tracking loop in the rough seeking mode, are absent from the construction of FIG. 1.

In the rough seeking mode for this comparison example, at the time of drive-controlling the optical pickup, the control is performed in such a state that only a slider servo-loop is closed while a tracking servo-loop is opened as in the aforementioned related art technique. As a circuit state, the SW1 is opened. At the same time, the b side of the switch SW2, is closed, so that a slider servo-control loop is closed.

As for the servo-control mechanism of the slider and the normal mode operation in the comparison example, the explanations are omitted since they are the same as the embodiment.

Figure 4:
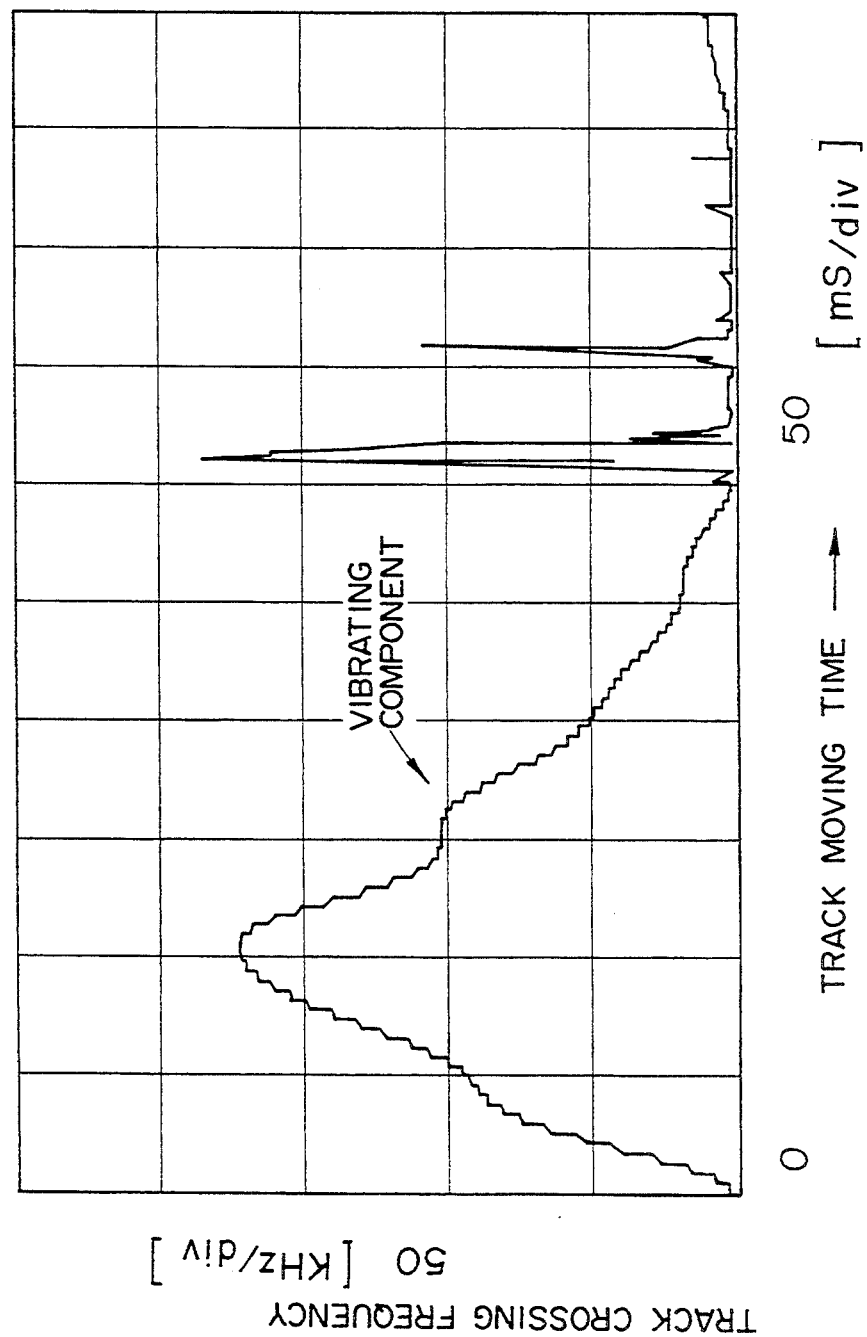
FIG. 4 is a figure which indicates a track crossing frequency characteristic of the tracking unit with respect to a track moving time in a rough seeking mode of the comparison example of FIG. 3.

FIG. 4 shows the track crossing frequency characteristic with respect to the track moving time of the tracking unit in the rough seeking mode of the drive control apparatus for the optical pickup of the comparison example of FIG. 3.

By comparing FIG. 2 with FIG. 4, it is easily understood that the vibrating component generated in the construction of FIG. 1 at the time of acceleration and deceleration of the slider, is effectively restrained by virtue of the tracking loop including the slider speed detecting means, the track crossing speed detecting means and so on, according to the embodiment of FIG. 1.

Figure 5:
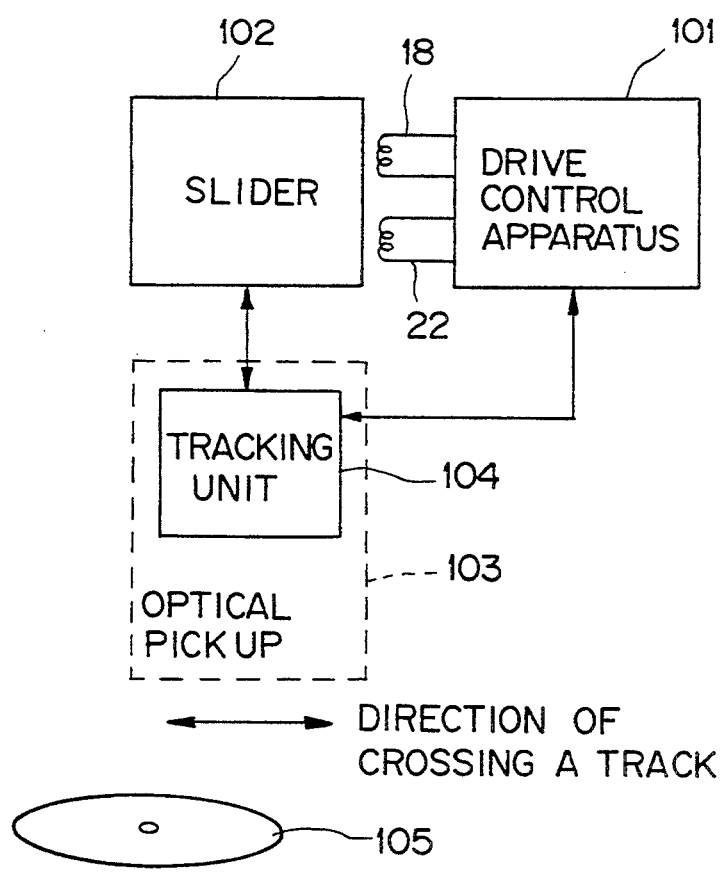
FIG. 5 is a diagram showing the construction of the drive control apparatus, the slider and the optical pickup in the embodiment.

FIG. 5 is a diagram showing the drive control apparatus of the embodiment of FIG. 1, with the slider and the optical pickup.

In FIG. 5, a drive control apparatus 101 is the same as the drive control apparatus of FIG. 1. A slider 102 is driven by the slider driving coil 18, and the speed of the slider 102 is detected by the slider speed detecting coil 22. The slider 102 is adapted to transfer an optical pickup 103 in the direction of crossing the track on an optical disk 105. A tracking unit 104 is mounted on the slider such that the tracking unit 104 is movable in the direction of crossing the track. In this manner, the aforementioned tracking loop is established by the drive control apparatus 101, the slider 102, and the tracking unit 104 in the rough seeking mode. Thus, it becomes possible to control the vibration in correspondence with each peculiar characteristic of the slider and the tracking unit according to the present embodiment.

As described above in detail, by preparing the slider speed detecting device and the track crossing speed detecting device, it becomes possible to directly extract the vibrating component of the tracking unit. By this, it becomes possible to actually measure the force applied to the tracking unit, control the vibration of the tracking unit further effectively, and obtain a good characteristic. By restraining the vibration in the direction of crossing the track, the focus servo-control can be stabilized in a two axes unit, for example. Therefore, the level of the tracking signal can be stabilized, and the error in the track count can be prevented. Moreover, it becomes possible to smoothly close tracking at the end of the rough seeking operation, and thus the access speed can be improved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A drive control apparatus for an optical pickup, which is provided with a slider for transporting the optical pickup in a direction of crossing a track on an optical disk, and a tracking unit mounted on said slider movably in the direction of crossing the track, and to which a rough seeking mode to access a desired track on said optical disk at a high speed is set as one operation mode of said optical pickup, said drive control apparatus comprising:

a slider transferring speed detecting means for detecting a transferring speed of said slider;

a track crossing speed detecting means for detecting a track crossing speed when said slider crosses the track, said track crossing speed being prescribed by a sum of the transferring speed of said slider and a relative speed of said tracking unit with respect to said slider including a vibrating component of said tracking unit;

a vibrating component extracting means for extracting the vibrating component of said tracking unit by subtracting the detected transferring speed of said slider from the detected track crossing speed in the rough seeking mode, and for outputting a vibrating component signal indicating the extracted vibrating component; and a loop for feeding back the vibrating component signal to said tracking unit in the rough seeking mode.

2. A drive control apparatus according to claim 1, wherein said slider transferring speed detecting means comprises a coil for detecting the slider transferring speed.

3. A drive control apparatus according to claim 2, wherein said slider transferring speed detecting means further comprises a leak compensating equalizer for outputting a presumed leak output corresponding to a slider driving current to drive the slider, and an adder for subtracting the presumed leak output from a detection signal of said coil.

4. A drive control apparatus according to claim 1, wherein said track crossing speed detecting means comprises a tracking detecting device for detecting a tracking position error, a zero-cross comparator for detecting a crossing of the track on the basis of the detected tracking position error, and a monomultivibrator to output the track crossing speed on the basis of the detected crossing of the track.

5. A drive control apparatus according to claim 1, wherein said vibrating component extracting means comprises an adder for subtracting the detected transferring speed of said slider from the detected track crossing speed.

6. A drive control apparatus according to claim 1, wherein said loop comprises a switching means for selectively close and open said loop.

7. A drive control apparatus according to claim 6, wherein said switching means closes said loop in the rough seeking mode, and opens said loop in a normal operation mode of said optical pickup.

8. A drive control apparatus according to claim 1, wherein said loop comprises an equalizer for adjusting a signal frequency characteristic change and a phase change of the vibrating component signal due to the existence of a magnetic circuit in said loop.

* * * * *